(12) United States Patent
Koo et al.

(10) Patent No.: US 7,978,645 B2
(45) Date of Patent: Jul. 12, 2011

(54) METHOD OF CONFIGURING DEFAULT VALUES FOR CELL RE-SELECTION IN A WIRELESS COMMUNICATION SYSTEM

(75) Inventors: Hyoun Hee Koo, Gwangju (KR); Sang Rok Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 943 days.

(21) Appl. No.: 11/844,276

(22) Filed: Aug. 23, 2007

(65) Prior Publication Data

US 2008/0049681 A1 Feb. 28, 2008

(30) Foreign Application Priority Data

Aug. 23, 2006 (KR) .................. 10-2006-0079834

(51) Int. Cl.
*H04W 4/00* (2009.01)

(52) U.S. Cl. ........ 370/328; 370/331; 370/332; 370/338; 455/436

(58) Field of Classification Search .................. None
See application file for complete search history.

(56) References Cited

U.S. PATENT DOCUMENTS

| | | | | |
|---|---|---|---|---|
| 6,647,262 | B1 * | 11/2003 | Demetrescu et al. ......... | 455/436 |
| 2003/0054850 | A1 * | 3/2003 | Masseroni et al. ............ | 455/522 |
| 2004/0095906 | A1 | 5/2004 | Rajkotia | |
| 2005/0085232 | A1 * | 4/2005 | Laitinen et al. ............... | 455/445 |
| 2005/0107110 | A1 * | 5/2005 | Vasudevan et al. ........... | 455/525 |
| 2006/0068780 | A1 * | 3/2006 | Dalsgaard et al. ......... | 455/432.3 |
| 2006/0178153 | A1 * | 8/2006 | Tenny et al. .................. | 455/450 |
| 2006/0251019 | A1 * | 11/2006 | Dalsgaard et al. ............ | 370/331 |
| 2006/0251023 | A1 * | 11/2006 | Choi ............................ | 370/331 |
| 2010/0009672 | A1 * | 1/2010 | Lundell et al. ................ | 455/423 |

FOREIGN PATENT DOCUMENTS

| | | |
|---|---|---|
| EP | 1631099 | 3/2006 |
| RU | 2006105411 | 7/2006 |
| WO | 2004004397 | 1/2004 |
| WO | 2004089030 | 10/2004 |

\* cited by examiner

*Primary Examiner* — Anthony Sol
(74) *Attorney, Agent, or Firm* — Lee, Hong, Degerman, Kang & Waimey

(57) ABSTRACT

A method of configuring values of cell re-selection parameters for cell re-selection from a serving cell to a neighboring cell in a wireless communication system is disclosed. The method includes receiving from a network a first message via a first control channel, wherein the first message includes values of a first group of cell selection parameters, assigning pre-stored values of the cell selection parameters for the serving cell to values of a second group of the cell selection parameters, if the first message does not include the values of the second group of the cell selection parameters, and calculating the values of the cell re-selection parameters using the values of the first and the second groups of the cell selection parameters.

20 Claims, 2 Drawing Sheets

FIG. 2

METHOD OF CONFIGURING DEFAULT VALUES FOR CELL RE-SELECTION IN A WIRELESS COMMUNICATION SYSTEM This application claims the benefit of Korean Application No. P10-2006-079834, filed on Aug. 23, 2006, which is hereby incorporated by reference.

BACKGROUND OF THE INVENTION

1. Field of the Invention

The present invention relates to a method of configuring default values, and more particularly, to a method of configuring default values for cell re-selection in a wireless communication system.

2. Discussion of the Related Art

Global System for Mobile Communication (GSM) was developed to bring together different communication systems. Further, General Packet Radio Service (GPRS) introduced packet switched data into GSM systems. The GPRS provides packet data service which means that multiple users can share the same transmission channel, only transmitting when there is data to send. GSM can be referred to as circuit-switched data service which establishes a radio resource (RR) connection and reserves the full bandwidth of that circuit-switched data during the lifetime of the RR connection. The difference with packet data service is that the packet data service can have total available bandwidth dynamically dedicated to those users who are actually sending at any given moment, providing higher utilization where users only send or receive data intermittently.

Enhanced Data Rate for GSM Evolution (EDGE) introduced 8-phase shift keying (8-PSK) into GSM/GPRS networks. EDGE can use 8-PSK as well as Gaussian Minimum Shift Keying (GMSK) of GSM as the modulation scheme. With an exception of modulation scheme of GPRS, most of non-modulation techniques of GPRS can be applied to EDGE.

In the GSM, the GPRS, and/or the EDGE can be in various states or modes such as an idle mode, packet transfer mode, packet idle mode, and dual transfer mode. Here, the packet idle mode is based on packet switched (PS) service and is used when there is no traffic between a mobile station (MS) and a network.

As known, the MS can enjoy mobility between cells/sectors. In addition, the MS can move from one cell/sector to another cell/sector during various modes (e.g., idle mode). To put differently, the MS can move from a source cell to a target cell during idle mode. Here, the source cell refers to a cell in which the MS is currently located, and the target cell refers to the cell to which the MS seeks to enter or move. The process describing movement from the source cell to the target cell can be referred to as cell re-selection process.

SUMMARY OF THE INVENTION

Accordingly, the present invention is directed to a method of configuring default values for cell re-selection in a wireless communication system that substantially obviates one or more problems due to limitations and disadvantages of the related art.

An object of the present invention is to provide a method of configuring values of cell re-selection parameters for cell re-selection from a serving cell to a neighboring cell in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of configuring values of cell re-selection parameters for cell re-selection from a serving cell to a neighboring cell in a wireless communication system includes receiving from a network a first message via a first control channel, wherein the first message includes values of a first group of cell selection parameters, assigning pre-stored values of the cell selection parameters for the serving cell to values of a second group of the cell selection parameters, if the first message does not include the values of the second group of the cell selection parameters, and calculating the values of the cell re-selection parameters using the values of the first and the second groups of the cell selection parameters.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1A:
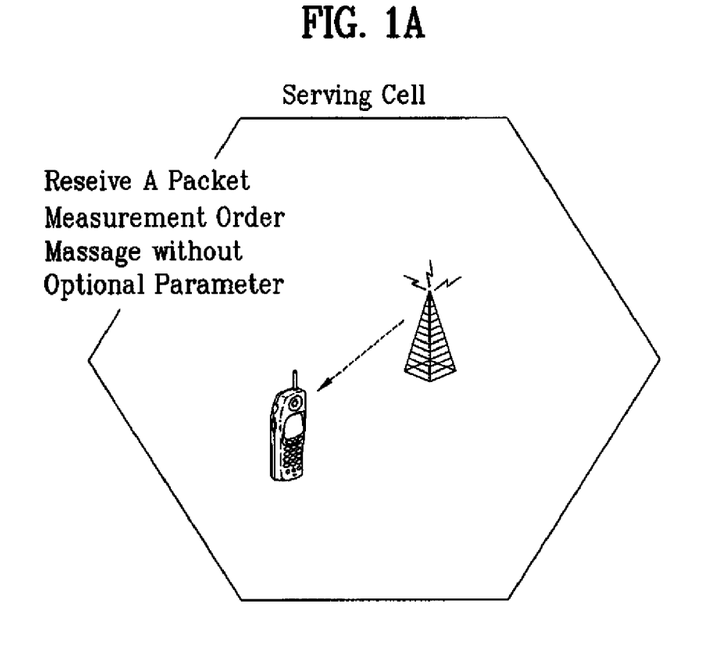
FIG. 1A is an exemplary diagram illustrating reception of a packet measurement order message from the network.

FIG. 1A is an exemplary diagram illustrating reception of a packet measurement order message from the network. By transmitting the packet measurement order message, the network orders the MS to calculate necessary parameter(s) for cell re-selection and provides information for network control measurement (NC) reporting. If the parameters for the NC measurements are not included, then a previous packet measurement order message belonging to the same set of messages can still be considered valid.

The packet measurement order message from the network can be transmitted to the MS on a packet common control channel (PCCCH) or a packet associated control channel (PACCH). If the information does not fit into one message (or the size of the information exceeds the message capacity), the remaining information can be sent in other packet measurement order message.

Figure 1B:
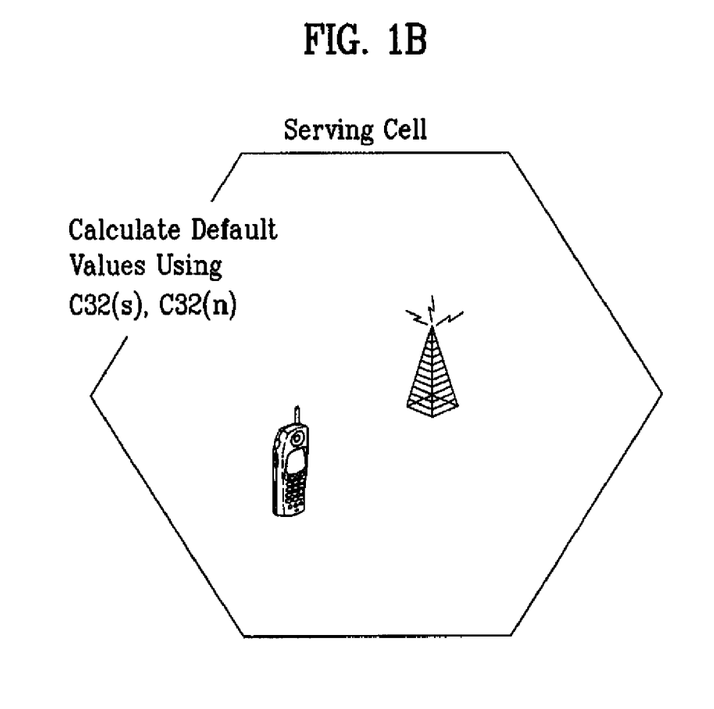
FIG. 1B is an exemplary diagram illustrating calculation of a packet measurement order message from the network.

FIG. 1B is an exemplary diagram illustrating calculation of a packet measurement order message from the network. More specifically, the MS can use the information included in the packet measurement order message (e.g., neighbor cell measurement reporting) to calculate the parameter(s) for cell re-selection. In calculating the parameter(s), default value(s) can be used as well. Thereafter, the MS can transmit a packet measurement result message, including the calculated parameter(s), to the network.

A detailed description of the packet measurement order message as well as information related to neighbor cells will be described hereinafter.

A packet measurement order message includes network control (NC) measurement parameters. The NC measurement parameters provides the parameters for the serving cell and may contain frequency list deviations (add/delete) to the GPRS, for example, either on the PBCCH or on broadcast control channel (BCCH). As shown below in a part of a packet measurement order information elements table, Table 1, the NC measurement parameters are included as an optional element in the packet measurement order message.

TABLE 1

< Packet Measurement Order message content > : : =
  < PAGE_MODE : bit (2) >
  { { 0 < Global TFI : < Global TFI IE > >
    | 10 < TLLI / G-RNTI : bit (32) > }
    { < PMO_INDEX : bit (3) >
    < PMO_COUNT : bit (3) >
  { 0 | 1 < NC Measurement Parameters : < NC Measurement
  Parameters struct > > }

The "NC measurement parameters struct" contains the network control order, the NC parameters, and an NC frequency list struct. If the value of the network control order or any of the NC parameters differs between instances of the message, the value of the parameter in the instance with the highest PMO_INDEX can be used or considered valid and all others can be ignored.

The purpose of the PMO_INDEX field and the PMO_COUNT field is to indicate the number of individual messages within the sequence of the packet measurement order messages and to assign an index to identify each one of them. The PMO_INDEX field is binary coded with a range of 0 to 7, and provides an index to identify the individual packet measurement order message. Similarly, the PMO_COUNT field is binary coded with a range of 0 to 7, and provides the PMO_INDEX value for the last (highest indexed) message is the sequence of packet measurement order messages. Furthermore, the measurement order is not affected by the MS until all instances of the packet measurement order message are received.

If global TFI field is present, this information element indicates the MS to which this message is addressed. In addition, if TLLI/G-RNTI, which is a 32-bit field, is present, this field also indicates the MS to which this message is addressed.

As optional element, the packet measurement order message may or may not include the NC Measurement parameters. If the message includes these parameters, the structure of the NC measurement parameters can be shown as in Table 2.

TABLE 2

< NC Measurement Parameters struct > : : =
  < NETWORK_CONTROL_ORDER : bit (2) >

TABLE 2-continued

{ 0 | 1 < NC_ NON_DRX_PERIOD : bit (3) >
  < NC_REPORTING_PERIOD_I : bit (3) >
  < NC_REPORTING_PERIOD_T : bit (3) > }
{ 0 | 1 < NC—FREQUENCY—LIST :
  < NC Frequency list struct > > } ;

Referring to Table 2, the NC measurement parameters include mandatory elements as well as optional elements. More specifically, as a mandatory requirement, the NC measurement parameter may include the NETWORK_CONTROL_ORDER parameter. Moreover, as the optional parameters NC_NON_DRX_PERIOD_I, NC_REPORTING_PERIOD_T, and the NC_FREQUENCY_LIST may be included. Each of these optional parameters can be represented by a 3-bit field.

Furthermore, the NETWORK_CONTROL_ORDER field can be coded according to the following table—Table 3.

TABLE 3

| Bit | |
|---|---|
| 2 1 | |
| 0 0 | NC0 |
| 0 1 | NC1 |
| 1 0 | NC2 |
| 1 1 | RESET |

As an element of the NC measurement parameters, the NC_FREQUENCY LIST parameter can be provided as optional element. If, however, the NC_FREQUENCY_LIST is present, then an exemplary structure of the list can be as follows as shown in Table 4.

TABLE 4

< NC Frequency list struct > : : =
  { 0 | 1 { < NR_OF_REMOVED_FREQ : bit (5) >
    { < REMOVED_FREQ_INDEX : bit (6) > } *
    (1 + val(NR_OF_REMOVED_FREQ)) } }
  { 1 < List of added Frequency struct : < Add Frequency list struct > >}
  ** 0;

As emphasized by bold type, a list of added frequency structure can be included in the NC frequency list. As shown in Table 4, the NR_OF_REMOVED_FREQ is a 5 bit field, and 1+val(NR_OF_REMOVED_FREQ) indicates the number of frequencies in the list which may not be used for NC measurements and provides the number of instances of the parameter REMOVED_FREQ_INDEX.

In addition, the REMOVED_FREQ_INDEX is a 6-bit field and is used to indicate the index to the frequency to be removed in the GPRS sent on the PBCCH or on the BCCH.

Further, included in the "NC frequency list struct" can be a deviation list which contains removed or added frequencies to a different list (e.g., GPRS list).

As one of the optional elements of the list of added frequency structure, cell selection parameters can be included. Hence, if the cell selection parameters (emphasized in bold) are included in the list of added frequency structure, then a cell structure comprising the cell selection parameters can be shown as in Table 5.

TABLE 5

< Add Frequency list struct > : : =
  < START_FREQUENCY : bit (10) >

TABLE 5-continued

```
< BSIC : bit (6) >
{ 0 | 1 < Cell selection params : < Cell Selection struct > > }
< NR_OF_FREQUENCIES : bit (5) >
< FREQ_DIFF_LENGTH : bit (3) >
{ < FREQUENCY_DIFF : bit (1+val(FREQ_DIFF_LENGTH)) >
    < BSIC : bit (6) >
    { 0 | 1 < Cell selection params : < Cell
    Selection struct >       > } } *
(val(NR_OF_FREQUENCIES));
```

Referring to Table 5, the "Add Frequency list struct" contains the frequency list for the NC parameters. More specifically, START_FREQUENCY, FREQ_DIFF_LENGTH, and FREQUENCY_DIFF are represented by a 10-bit field, a 3-bit field, and a (1+val(FREQ_DIFF_LENGTH)) bit field, respectively. Moreover, the BSIC is a 6-bit field and is encoded as the "Base Station Identity Code" with a range of 0 to 63.

The "Cell selection params" in the "Add Frequency list struct" can be present for the first neighbor cell added by the message. As an abnormal case, if the "Cell selection params" is missed (not present) for the first neighbor cell added by the message, then the same parameters as the serving cell can be applied as default value.

Furthermore, a structure (or cell selection structure) of the cell selection parameters can be represented as in Table 6.

TABLE 6

```
< Cell Selection struct > : : =
    < CELL_BAR_ACCESS_2 : bit (1) >
    < EXC_ACC : bit >
    < SAME_RA_AS_SERVING_CELL : bit (1) >
    { 0 | 1 < GPRS—RXLEV—ACCESS—MIN : bit (6) >
         < GPRS—MS—TXPWR—MAX—CCH : bit (5) > }
    { 0 | 1 < GPRS—TEMPORARY—OFFSET : bit (3) >
         < GPRS—PENALTY—TIME : bit (5) > }
    { 0 | 1 < GPRS—RESELECT—OFFSET : bit (5) > }
    { 0 | 1 < HCS params : < HCS struct > > }
    { 0 | 1 < SI13—PBCCH—LOCATION :
    < SI13_PBCCH_LOCATION struct > > } ;
< HCS struct > : : =
    < PRIORITY—CLASS : bit (3) >
    < HCS—THR : bit (5) > ;
```

Referring to Table 6, the parameters, such as GPRS_RXLEV_ACCESS_MIN, GPRS_MS_TXPWR_MAX_CCH, GPRS_TEMPORARY_OFFSET, GPRS_PENALTY_TIME, GPRS_RESELECT_OFFSET, PRIORITY_CLASS OF HCS params, HCS_THR, and SI13_PBCCH_LOCATION, are optional parameters that can be used to cell re-selection.

With respect to the packet measurement order message, if any parameter or a part of a parameter (e.g., element) related to neighboring cell(s) is not included, there is no default value that can be used in its place. More detailed discussions related to unavailability of the default value(s) is discussed below in terms of possible cases or situations.

The discussion of default values for the parameters associated with the first neighboring cell in the packet measurement order message as shown below in following cases or situations (Case#1-Case#3) can be found in Table 11.2.9b.2 of section 12.2.9b of 3GPP TS 44.060 V.6.180. The same parameters, as described below, can also be found in 3GPP TS 44.060 V7.5.0.

First, consider a case (i.e., Case #1) in which cell selection parameters are not provided (or missed) in the packet measurement order message but the PCCCH is present in the serving cell. Table 7 illustrates this case.

TABLE 7

| | |
|---|---|
| CELL_BAR_ACCESS_2: | Serving cell CELL_BAR_ACCESS_2 |
| EXC_ACC: | Serving cell EXC_ACC |
| SAME_RA_AS_SERVING_CELL: | The cell is in the same Routing Area as the serving cell |
| GPRS_RXLEV_ACCESS_MIN: | Serving cell GPRS_RXLEV_ACCESS_MIN |
| GPRS_MS_TXPWR_MAX_CCH: | Serving cell GPRS_MS_TXPWR_MAX_CCH |
| GPRS_TEMPORARY_OFFSET: | Serving cell GPRS_TEMPORARY_OFFSET |
| GPRS_PENALTY_TIME: | Serving cell GPRS_PENALTY_TIME |
| GPRS_RESELECT_OFFSET: | 0 dB |
| HCS_THR: | Serving cell HCS_THR |
| PRIORITY_CLASS: | Serving cell PRIORITY_CLASS |
| SI13_PBCCH_LOCATION: | Undefined. |

As indicated in this case, if the cell selection parameters (or cell selection params) are not provided for the first neighbor cell added by the message, then the same parameters as the serving cell can be applied as the default value.

Second, Case #2 considers where the cell selection parameters are not provided (or present) in the packet measurement order message and the PCCCH is also not provided (or present) in the serving cell, as shown in Table 8.

TABLE 8

| | |
|---|---|
| CELL_BAR_ACCESS_2: | Serving cell CELL_BAR_ACCESS |
| EXC_ACC: | Serving cell cell exclusive access support capability |
| SAME_RA_AS_SERVING_CELL: | The cell is in the same Routeing Area as the serving cell |

Third, Case #3 considers where the cell selection parameters are provided (or present) in the packet measurement order message but the optional parameters are not provided (or present) in whole or in part.

TABLE 9

| | |
|---|---|
| GPRS_RXLEV_ACCESS_MIN: | Serving cell RXLEV_ACCESS_MIN |
| GPRS_MS_TXPWR_MAX_CCH: | Serving cell MS_TXPWR_MAX_CCH |
| GPRS_TEMPORARY_OFFSET: | Serving cell TEMPORARY_OFFSET |
| GPRS_PENALTY_TIME: | Serving cell PENALTY_TIME |
| GPRS_RESELECT_OFFSET: | 0 dB |
| HCS_THR: | infinity |
| PRIORITY_CLASS: | undefined |
| SI13_PBCCH_LOCATION: | undefined |

The definitions of the parameters, such as CELL_BAR_ACCESS_2, EXC_ACC, SAME_RA_AS_SERVING_CELL, GPRS_RXLEV_ACCESS_MIN, RXLEV_ACCESS_MIN, GPRS_MS_TXPWR_MAX_CCH, GPRS_MS_TXPWR_MAX_CCH, GPRS_TEMPORARY_OFF-SET, GPRS_PENALTY_TIME, GPRS_RESELECT_ OFF- SET, HCS_THR, PRIORITY_CLASS, and SI13_PBCCH_LOCATION, are provided in 3GPP TS 45.008 or 3GPP TS 44.060. Therefore, discussions related to definitions of these parameters will be omitted.

Furthermore, default values are provided to address possibilities of Cases #1-#3. A packet system information type 3 (PSI3) includes the parameters used as default values for optional parameters in the packet measurement order message, and a PSI3 message is usually transmitted via a packet broadcast control channel (PBCCH). However, as discussed, the packet measurement order message is based on the PCCCH, and as a result, the origin of the default value(s) may become ambiguous.

In short, since the parameters are defined with respect to the PCCCH, the MS may not be able to perform efficient and/or effective cell re-selection since the PBCCH was not considered in order to get the information from a PSI3 message.

As discussed, the MS can freely move from one cell to another cell in the wireless communication environment. It is also possible for the MS to move to another cell while in a packet idle mode. Here, the cell which currently hosts the MS can be referred to as a source cell, and the cell to which the MS moves to can be referred to as a target cell.

If the MS moves from the source cell to the target cell during the packet idle mode, the MS can perform cell re-selection. Prior to performing the cell re-selection process, the MS receives a packet measurement order message from the network, requesting the MS to measure various information for cell re-selection.

The MS uses the information related to neighbor cells (or list) included in the packet measurement order message and calculates certain parameters associated with cell re-selection. For example, the MS can calculate a cell ranking criterion parameter (i.e., C32). Here, C32 can be used for selection of a specific cell from the neighboring cell(s) having the same priority and can be defined as follows as shown in Equation 1.

$$C32(s) = C1(s)$$

$$C32(n) = C1(n) + GPRS\_RESELECT\_OFFSET(n) - T0(n) * (1 - L(n))$$ [Equation 1]

Referring to Equation 1, C32(s) and C32(n) respectively denote the cell priority of parameters associated with the serving cell and the neighboring cell. Moreover, C1(s) and C1(n) denote a path loss criterion parameter for the serving cell and the neighboring cell, respectively. The path loss criterion parameter, or C1, can be defined by Equation 2.

$$C1 = (A - \text{Max}(B, 0))$$

$$A = RLA\_P - GPRS\_RXLEV\_ACCESS\_MIN$$

$$B = GPRS\_MS\_TXPWR\_MAX\_CCH - P$$ [Equation 2]

Referring to Equation 2, RLA_P denotes received level averages, and GPRS_RXLEV_ACCESS_MIN denotes a minimum received signal level requested to the MS for system access. Moreover, GPRS_MS_TXPWR_MAX_CCH denotes a maximum transmit power level requested to the MS for system access until other order is given, and P denotes a maximum radio frequency (RF) output power by the MS.

In Equation 1, GPRS_RESELECT_OFFSET parameter is for applying prescribed offset value and/or hysteresis value to each cell. In addition, T0(n) and L(n) can be further defined as follows as shown in Equation 3.

$$T0(n) = GPRS\_TEMPORARY\_OFFSET(n) *$$

$$H(GPRS\_PENALTY\_TIME(n) - T(n))$$

$$L(n) = 0 \text{ if } PRIORITY\_CLASS(n) = PRIORITY\_CLASS(s)$$

$$= 1 \text{ if } PRIORITY\_CLASS(n) \neq PRIORITY\_CLASS(s)$$ [Equation 3]

Referring to Equation 3, GPRS_TEMPORARY_OFFSET indicates a negative offset which is applied to C31/C32 during GPRS_PENALTY_TIME after timer, T, is initiated in the corresponding cell. Here, timer T is initiated for each cell selected from a list of carriers having the strongest signals. In other words, timer T is initiated for cells having the strongest signals. If the MS moves to one of the cells having the strongest signals, then timer T is initiated starting from 0. However, if the serving cell is one of the cells listed in the list during the cell re-selection process, timer T is set to the value of GPRS_PENALTY_TIME. Moreover, H(x)=0 (for x<0), 1 (for x>0).

As discussed, parameters such as GPRS_RXLEV_ACCESS_MIN, GPRS_MS_TXPWR_MAX_CCH, GPRS_RESELECT_OFFSET, GPRS_TEMPORARY_OFFSET, GPRS_PENALTY_TIME, PRIORITY_CLASS, and PRIORITY_CLASS, HCS_THR, SI13_PBCCH_LOCATION are optional parameters.

If these optional parameters are excluded or not present in the packet measurement order message for the first neighbor cell, default value(s) can be used instead. As discussed, with respect to cell re-selection, there can be complications associated with PCCCH/PACCH-based packet measurement order message in terms of using the default values, especially if the PBCCH is present in the serving cell. The following discussions/examples address situations take into account reference to system information received on the broadcast control channel (e.g., PBCCH) for configuring default values associated with cell re-selection.

Depending on the situation of the MS, the default value(s) can be configured accordingly. The following are examples of four (4) cases. For more detailed description, FIG. 2 can be referred to as an exemplary flowchart illustrating a process of setting the default values.

Figure 2:
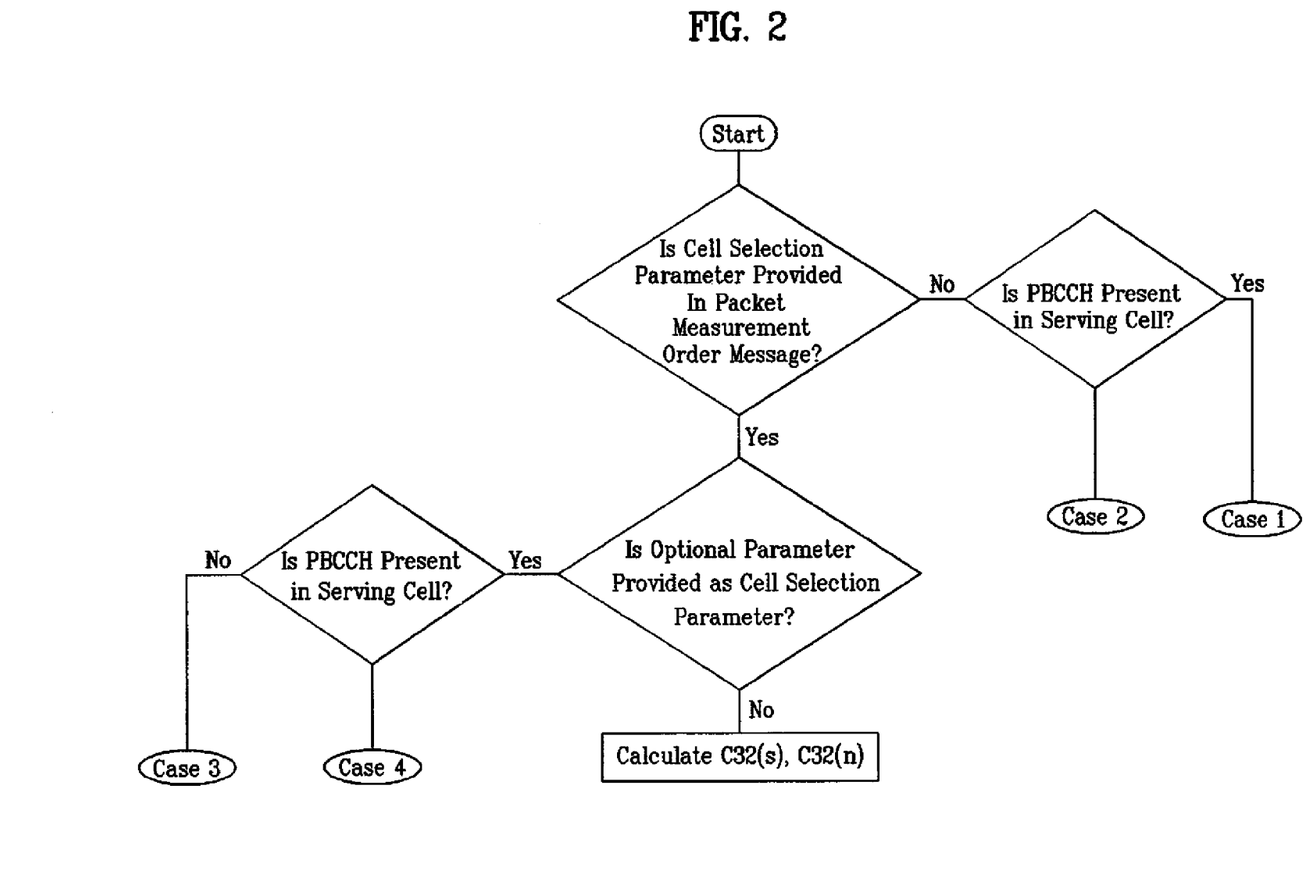
FIG. 2 is an exemplary flowchart illustrating a process of setting the default values.

First, Case #1 represents a situation where cell selection parameters for the neighboring cell(s) are not provided (or not present) in the packet measurement order message but PBCCH is provided in the serving cell. Hence, the PSI3 message can be received via the PBCCH. Here, the MS can refer to PSI3 message received via the PBCCH and set/assign the default values for the parameters which are excluded (or not present) in the received packet measurement order message for the first neighbor cell. That is, the MS uses the parameter values of the PSI3 message and assigns the same values to the corresponding parameters whose values are not provided in the packet measurement order message. As for the remaining parameters, predetermined default values can be used.

The PSI3 message is transmitted via the PBCCH, and the structure of the PSI3 message including the mandatory parameters are shown in Table 10.

TABLE 10

```
< PSI3 message content > : : =
    < PAGE_MODE : bit (2) >
    < PSI3_CHANGE_MARK : bit (2) >
    < PSI3_BIS_COUNT : bit (4) >
    < Serving Cell parameters : < Serving Cell params struct > >
< Serving Cell params struct > : : =
    < CELL—BAR—ACCESS—2 : bit >
    < EXC—ACC : bit >
    < GPRS—RXLEV—ACCESS—MIN : bit (6) >
    < GPRS—MS—TXPWR—MAX—CCH : bit (5) >
    { 0 | 1 < HCS Serving Cell parameters : < HCS struct > > }
    < MULTIBAND—REPORTING : bit (2) >;
```

Referring to Table 10, the serving cell parameters included in the PSI3 message include CELL_BAR_ACCESS_2, EXC_ACC, GPRS_RXLEV_ACCESS_MIN, GPRS_MS_TXPWR_MAX_CCH, MULTIBAND_REPORTING, HCS_THR of HCS struct, and PRIORITY_CLASS.

If the HCS struct is omitted for the serving cell, HCS is not used and the HCS parameters for the other cells can be neglected (i.e., the HCS signal strength threshold shall be set to infinity for all cells). Otherwise PRIORITY_CLASS and HCS_THR are defined. The use of the HCS parameters is defined in 3GPP TS 45.008 (See Table 6).

The default values associated with Case #1 can be defined as follows as shown in Table 11.

TABLE 11

| | |
|---|---|
| CELL_BAR_ACCESS_2: | Serving cell CELL_BAR_ACCESS_2 |
| EXC_ACC: | Serving cell EXC_ACC |
| SAME_RA_AS_SERVING_CELL: | The cell is in the same Routeing Area as the serving cell |
| GPRS_RXLEV_ACCESS_MIN: | Serving cell GPRS_RXLEV_ACCESS_MIN |
| GPRS_MS_TXPWR_MAX_CCH: | Serving cell GPRS_MS_TXPWR_MAX_CCH |
| GPRS—TEMPORARY—OFFSET: | 0 dB |
| GPRS—PENALTY—TIME: | Undefined |
| GPRS_RESELECT_OFFSET: | 0 dB |
| HCS_THR: | Serving cell HCS_THR |
| PRIORITY_CLASS: | Serving cell PRIORITY_CLASS |
| SI13_PBCCH_LOCATION: | Undefined. |

Second, Case #2 represents a situation where cell selection parameters are not provided (or present) in the packet measurement order message and the PBCCH is also not provided (or present) in the serving cell.

TABLE 12

| | |
|---|---|
| CELL_BAR_ACCESS_2: | Serving cell CELL_BAR_ACCESS |
| EXC_ACC: | Serving cell cell exclusive access support capability |
| SAME_RA_AS_SERVING_CELL: | The cell is in the same Routeing Area as the serving cell |

Referring to Table 12, the PBCCH is not present in the serving cell.

In such a case, the PSI3 message cannot be received via the PBCCH. Therefore, the MS can rely on a system information type 3 (SI3) message, which is transmitted via a broadcast control channel (BCCH), to apply the default value(s) for the mandatory parameter(s) for the neighboring cell(s).

Similarly to above, the MS uses the parameter values of the SI3 message and assigns the same values to the corresponding parameters whose values are not provided in the packet measurement order message.

The SI3 message can include various elements as shown in Table 13.

TABLE 13

| IEI | Information Element | Type/Refefence | Presence | Format | length |
|---|---|---|---|---|---|
| | L2 Pseudo Length | L2 Pseudo Length 10.5.2.19 | M | V | 1 |
| | RR management Protocol Discriminator | Protocol Discriminator 10.2 | M | V | ½ |
| | Skip Indicator | Skip Indicator 10.3.1 | M | V | ½ |
| | System Information Type Message Type | Message Type 10.4 | M | V | 1 |
| | Cell Identity | Cell Identity 10.5.1.1 | M | V | 2 |
| | Identification Location | Location Area Identification 10.5.1.3 | M | V | 5 |
| | Description Control | Control Channel Description 10.5.2.11 | M | V | 3 |
| | Cell Options | Cell Options (BCCH) 10.5.2.3 | M | V | 1 |
| | Cell Selection Parameters | Cell Selection Parameters 10.5.2.4 | M | V | 2 |
| | RACH Control Parameters | RACH Control Parameters 10.5.2.29 | M | V | 3 |
| | SI 3 Rest Octets | SI 3 Rest Octets 10.5.2.34 | M | V | 4 |

A more detailed description of the information elements (IE) of the cell selection parameters (in bold) are shown in FIG. 14.

TABLE 14

| 8 | 7 | 6 | 5 | 4 | 3 | 2 | 1 | |
|---|---|---|---|---|---|---|---|---|
| | | | Cell Selection Parameters IEI | | | | | Octet 1 |
| CELL-RESELECT HYSTERESIS | | | MS-TXPWR-MAX-CCH | | | | | Octet 2 |
| ACS | NECI | | RXLEV-ACCESS-MIN | | | | | Octet 3 |

The cell selection parameters list included in the SI3 message includes the cell selection parameters IE list. Furthermore, mandatory parameters such as MS_TXPWR_MAX_CCH and RXLEV_ACCESS_MIN are assigned to prescribed octets (e.g., Octet 2 and Octet 3) of the cell selection parameters IE list.

The default values of the first neighbor cell(s) with respect to Case #2 is shown in Table 15.

TABLE 15

| | |
|---|---|
| CELL_BAR_ACCESS_2: | Serving cell CELL_BAR_ACCESS_2 |
| EXC_ACC: | Serving cell EXC_ACC |
| SAME_RA_AS_SERVING_CELL: | The cell is in the same Routeing Area as the serving cell |
| GPRS_RXLEV_ACCESS_MIN: | Serving cell RXLEV_ACCESS_MIN |
| GPRS_MS_TXPWR_MAX_CCH: | Serving cell MS_TXPWR_MAX_CCH |
| GPRS—TEMPORARY—OFFSET: | 0 dB |
| GPRS—PENALTY—TIME: | Undefined |
| GPRS_RESELECT_OFFSET: | 0 dB |
| HCS_THR: | infinity |
| PRIORITY_CLASS: | Undefined |
| SI13_PBCCH_LOCATION: | Undefined |

Third, Case #3 represents a situation where the cell selection parameters for the first neighbor cell are provided (or present) in the packet measurement order message but some of the optional parameters are not provided and the PBCCH is not provided (or present) in the serving cell.

In this case, the SI3 message transmitted on the BCCH can be referred to by the MS to apply the necessary default values for the first neighbor cell. That is, the MS uses the parameter values of the SI3 message and assigns the same values to the corresponding parameters whose values are not provided in the packet measurement order message. Further, the optional parameters which are not present in the message can be affected by the following parameters as shown in Table 16.

TABLE 16

| | |
|---|---|
| GPRS_RXLEV_ACCESS_MIN: | Serving cell RXLEV_ACCESS_MIN |

TABLE 16-continued

| | |
|---|---|
| GPRS_MS_TXPWR_MAX_CCH: | Serving cell MS_TXPWR_MAX_CCH |
| GPRS—TEMPORARY—OFFSET: | 0 dB |
| GPRS—PENALTY—TIME: | Undefined |
| GPRS_RESELECT_OFFSET: | 0 dB |
| HCS_THR: | infinity |
| PRIORITY_CLASS: | undefined |
| SI13_PBCCH_LOCATION: | undefined |

Fourth, Case #4 represents a situation where the cell selection parameters for the first neighbor cell are provided (or present) in the packet measurement order message but some of the optional parameters are not provided and the PBCCH is provided (or present) in the serving cell. This is shown in Table 17 as follows.

TABLE 17

| | |
|---|---|
| GPRS_RXLEV_ACCESS_MIN: | Serving cell GPRS_RXLEV_ACCESS_MIN |
| GPRS_MS_TXPWR_MAX_CCH: | Serving cell GPRS_MS_TXPWR_MAX_CCH |
| GPRS_TEMPORARY_OFFSET: | 0 dB |
| GPRS_PENALTY_TIME: | Undefined |
| GPRS_RESELECT_OFFSET: | 0 dB |
| HCS_THR: | Serving cell HCS_THR |
| PRIORITY_CLASS: | Serving cell PRIORITY_CLASS |
| SI13_PBCCH_LOCATION: | Undefined |

Referring to Table 17, unlike in Case #2 and Case #3 in which the SI3 message was looked at since the PBCCH was not present. However, in Case #4, the PBCCH is present in the serving cell and hence, the PSI3 message can be referred to for applying the default value(s) for the first neighbor cell. That is, the MS uses the parameter values of the PSI3 message and assigns the same values to the corresponding parameters whose values are not provided in the packet measurement order message.

In the discussion of above with respect to Cases #1-#4, the PBCCH of the serving cell is referred to for applying the default value(s) for the first neighboring cell, and the default value(s) can be derived from (or based on) the PSI3 or SI3 message transmitted on the PBCCH or BCCH, respectively. In particular, the cell selection parameters exist but do not provide certain parameters, the parameter values provided in the PSI3 (or SI3) message can be used. Furthermore, a default value for GPRS_TEMPORARY_OFFSET parameter can be set to "0 dB," and a default value for GPRS_PENALTY_TIME parameter can be set as "undefined" so that C32(s)=C1(s) and C32(n)=C1(n) can be established in Equation 1.

Further, the discussion above related to cell re-selection can be implemented in an apparatus. That is, an apparatus associated with wireless communication system can be used to implement the cell re-selection process.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of configuring values of cell re-selection parameters for cell re-selection from a serving cell to a neighboring cell in a wireless communication system, the method comprising:
    receiving a first message from a network via a first control channel, the first message including values of a first group of cell selection parameters;
    assigning pre-stored values of the cell selection parameters for the serving cell to values of a second group of cell selection parameters if the first message does not include the values of the second group of cell selection parameters; and
    calculating values of the cell re-selection parameters using the values of the first group and the second group of cell selection parameters,
    wherein the pre-stored values of the cell selection parameters for the serving cell are received from the network in a second message via a second control channel,
    wherein the second group of cell selection parameters includes GPRS_RESELECT_OFFSET and GPRS_TEMPORARY_OFFSET, and
    wherein one of the cell re-selection parameters is a cell ranking criterion parameter (C32) for selection of a specific cell from neighboring cells, the cell ranking criterion parameter defined as:

$C32(s)=C1(s)$ $C32(n)=C1(n)+\text{GPRS\_RESELECT\_OFFSET}(n)-T0(n)*(1-L(n))$, where C32(s) and C32(n) respectively denote the cell priority of parameters associated with the serving cell and the neighbor cell, C1(s) and C1(n) denote a path loss criterion parameter for the serving cell and the neighbor cell, respectively, and the GPRS_RESELECT_OFFSET parameter is for applying at least one of a prescribed offset value and a hysteresis value to each cell, and
    where T0(n) and L(n) are defined as:

$T0(n)=\text{GPRS\_TEMPORARY\_OFFSET}(n)*H(\text{GPRS\_PENALTY\_TIME}(n)-T(n))$, $L(n)=0$ if PRIORITY_CLASS$(n)$=PRIORITY_CLASS$(s)$, $L(n)=1$ if PRIORITY_CLASS$(n) \neq$ PRIORITY_CLASS$(s)$, where GPRS_TEMPORARY_OFFSET indicates a negative offset which is applied to C32 during GPRS_PENALTY_TIME after timer, T, is initiated in a corresponding cell and values of GPRS_RESELECT_OFFSET(n) and GPRS_TEMPORARY_OFFSET(n) are defined as 0, respectively.

2. The method of claim 1, wherein the cell selection parameters are for a first neighboring cell.

3. The method of claim 1, wherein the first control channel is a packet common control channel (PCCCH) or a packet associated control channel (PACCH), and the first message is a packet measurement order message.

4. The method of claim 1, wherein the second control channel is a packet broadcast control channel (PBCCH) and the second message is a packet system information type 3 (PSI3) message.

5. A mobile station for configuring values of cell re-selection parameters for cell re-selection from a serving cell to a neighboring cell in a wireless communication system, the mobile station configured for:
    receiving a first message from a network via a first control channel, the first message including values of a first group of cell selection parameters;
    assigning pre-stored values of the cell selection parameters for the serving cell to values of a second group of the cell selection parameters if the first message does not include the values of the second group of cell selection parameters; and
    calculating values of the cell re-selection parameters using the values of the first group and the second group of cell selection parameters,
    wherein the pre-stored values of the cell selection parameters for the serving cell are received in a second message from the network via a second control channel,
    wherein the second group of cell selection parameters includes GPRS_RESELECT_OFFSET and GPRS_TEMPORARY_OFFSET,
    wherein one of the cell re-selection parameters is a cell ranking criterion parameter (C32) for selection of a specific cell from neighboring cells, the cell ranking criterion parameter defined as $C32(s)=C1(s)$ $C32(n)=C1(n)+\text{GPRS\_RESELECT\_OFFSET}(n)-T0(n)*(1-L(n))$, where C32(s) and C32(n) respectively denote the cell priority of parameters associated with the serving cell and the neighbor cell, C1(s) and C1(n) denote a path loss criterion parameter for the serving cell and the neighbor cell, respectively, and the GPRS_RESELECT_OFFSET parameter is for applying at least a prescribed offset value or a hysteresis value to each cell, and
    wherein T0(n) and L(n) are defined as:

$T0(n) = \text{GPRS\_TEMPORARY\_OFFSET}(n) * H(\text{GPRS\_PENALTY\_TIME}(n) - T(n))$ $L(n) = 0$ if PRIORITY_CLASS$(n)$ = PRIORITY_CLASS$(s)$, $L(n) = 1$ if PRIORITY_CLASS$(n) \neq$ PRIORITY_CLASS$(s)$, where GPRS_TEMPORARY_OFFSET indicates a negative offset which is applied to C32 during GPRS_PENALTY_TIME after timer, T, is initiated in a corresponding cell and values of GPRS_RESELECT_OFFSET(n) and GPRS_TEMPORARY_OFFSET(n) are defined as 0, respectively.

6. The mobile station of claim 5, wherein the cell selection parameters are for a first neighboring cell.

7. The mobile station of claim 5, wherein the first control channel is a packet common control channel (PCCCH) or a packet associated control channel (PACCH) and the first message is a packet measurement order message.

8. The mobile station of claim 5, wherein the second control channel is a packet broadcast control channel (PBCCH) and the second message is a packet system information type 3 (PSI3) message.

9. A method of configuring values of cell selection parameters for cell re-selection from a serving cell to a neighboring cell in a wireless communication system, the method comprising:
receiving, by a mobile station from a network via a first control channel, a packet measurement order message providing information for network control (NC) measurement reporting and network controlled cell re-selection, the packet measurement order message including first cell selection parameters; and
receiving, by the mobile station from the network, a packet system information (PSI3) message, the PSI3 message including second cell selection parameters,
wherein parameter default values of optional parameters are affected by the second cell selection parameters and the PSI3 message is received via a packet broadcast control channel (PBCCH) if optional parameters of the first cell selection parameters are not present and PBCCH is present in the serving cell,
wherein the optional parameters are selected from GPRS_RXLEV_ACCESS_MIN, GPRS_MS_TXPWR_MAX_CCH, GPRS_TEMPORARY_OFFSET, GPRS_PENALTY_TIME, GPRS_RESELECT_OFFSET, PRIORITY_CLASS, HCS_THR, and SI13_PBCCH_LOCATION, and
wherein a default value of GPRS_RXLEV_ACCESS_MIN is set to "Serving Cell GPRS_RXLEV_ACCESS_MIN,"
wherein a default value of GPRS_MS_TXPWR_MAX_CCH is set to "Serving Cell GPRS_MS_TXPWR_MAX_CCH,"
wherein a default value of GPRS_TEMPORARY_OFFSET is set to "0 dB,"
wherein a default value of GPRS_PENALTY_TIME is set to "Undefined,"
wherein a default value of GPRS_RESELECT_OFFSET is set to "0 dB,"
wherein a default value of HCS_THR is set to "Serving cell HCS_THR,"
wherein a default value of PRIORITY_CLASS is set to "Serving cell PRIORITY_CLASS," and
wherein a default value of SI13_PBCCH_LOCATION is set to "Undefined."

10. The method of claim 9, wherein the first control channel is a packet common control channel (PCCCH) or a packet associated control channel (PACCH).

11. The method of claim 9, wherein the first cell selection parameters are for a first neighboring cell.

12. The method of claim 9, further comprising: measuring information for the cell reselection using the parameter default values.

13. The method of claim 9, further comprising:
calculating a cell ranking criterion parameter (C32) using values of the first cell selection parameters and the second cell selection parameters.

14. A method of configuring values of cell selection parameters for cell re-selection from a serving cell to a neighboring cell in a wireless communication system, the method comprising:
transmitting, by a network to a mobile station via a first control channel, a packet measurement order message providing information for network control (NC) measurement reporting and network controlled cell reselection, the packet measurement order message including first cell selection parameters; and
transmitting, by the network to the mobile station, a packet system information (PSI3) message, the PSI3 message including a second cell selection parameters,
wherein parameter default values of optional parameters are affected based on the second cell selection parameters and the PSI3 message is received via a packet broadcast control channel (PBCCH) if optional parameters of the first cell selection parameters are not present and the PBCCH is present in the serving cell,
wherein the optional parameters are selected from GPRS_RXLEV_ACCESS_MIN, GPRS_MS_TXPWR_MAX_CCH, GPRS_TEMPORARY_OFFSET, GPRS_PENALTY_TIME, GPRS_RESELECT_OFFSET, PRIORITY_CLASS, HCS_THR, and SI13_PBCCH_LOCATION, and
wherein a default value of GPRS_RXLEV_ACCESS_MIN is set to "Serving Cell GPRS_RXLEV_ACCESS_MIN,"
wherein a default value of GPRS_MS_TXPWR_MAX_CCH is set to "Serving Cell GPRS_MS_TXPWR_MAX_CCH,"
wherein a default value of GPRS_TEMPORARY_OFFSET is set to "0 dB,"
wherein a default value of GPRS PENALTY TIME is set to "Undefined,"
wherein a default value of GPRS_RESELECT_OFFSET is set to "0 dB,"
wherein a default value of HCS_THR is set to "Serving cell HCS_THR,"
wherein a default value of PRIORITY_CLASS is set to "Serving cell PRIORITY_CLASS," and
wherein a default value of SI13_PBCCH_LOCATION is set to "Undefined."

15. The method of claim 14, wherein the first control channel is a packet common control channel (PCCCH) or a packet associated control channel (PACCH).

16. The method of claim 14, wherein the first cell selection parameters are for a first neighboring cell.

17. A mobile station for configuring values of cell selection parameters for cell re-selection from a serving cell to a neighboring cell in a wireless communication system, the mobile station configured for:
receiving, from a network via a first control channel, a packet measurement order message providing information for network control (NC) measurement reporting and network controlled cell re-selection, the packet measurement order message including first cell selection parameters; and
receiving, from the network, a packet system information (PSI3) message, the PSI3 message including a second cell selection parameters,
wherein parameter default values of optional parameters are affected by the second cell selection parameters and the PSI3 message is received via a packet broadcast control channel (PBCCH) if optional parameters of the first cell selection parameters are not present and a PBCCH is present in the serving cell, wherein the optional parameters are selected from GPRS_RXLEV_ACCESS_MIN, GPRS_MS_TXPWR_MAX_CCH, GPRS_TEMPORARY_OFFSET, GPRS_PENALTY_TIME, GPRS_RESELECT_OFFSET, PRIORITY_CLASS, HCS_THR, and SI13_PBCCH_LOCATION, wherein a default value of the GPRS_RXLEV_ACCESS_MIN is set to "Serving Cell GPRS_RXLEV_ACCESS_MIN,"

wherein a default value of the GPRS_MS_TXPWR_MAX_CCH is set to "Serving Cell GPRS_MS_TXPWR_MAX_CCH,"

wherein a default value of the GPRS_TEMPORARY_OFFSET is set to "0 dB,"

wherein the default value of the GPRS_PENALTY_TIME is set to "Undefined,"

wherein the default value of the GPRS_RESELECT_OFFSET is set to "0 dB,"

wherein a default value of the HCS_THR is set to "Serving cell HCS_THR,"

wherein a default value of the PRIORITY_CLASS is set to "Serving cell PRIORITY_CLASS," and wherein a default value of the SI13_PBCCH_LOCATION is set to "Undefined."

18. The mobile station of claim 17, wherein the first control channel is a packet common control channel (PCCCH) or a packet associated control channel (PACCH).

19. The mobile station of claim 17, wherein the first cell selection parameters are for a first neighboring cell.

20. The mobile station of claim 17, further comprising:
calculating a cell ranking criterion parameter (C32) using the values of the first and the second cell selection parameters.

* * * * *